United States Patent [19]
Nakajima et al.

[11] Patent Number: 5,034,494
[45] Date of Patent: Jul. 23, 1991

[54] TWO PART EPOXY RESIN COMPOSITION

[75] Inventors: Takao Nakajima, Kusatsu; Masaaki Murase, Takatsuki; Nobuo Agari, Toyanaka, all of Japan

[73] Assignee: Sunstar Giken Kabushiki Kaisha, Osaka, Japan

[21] Appl. No.: 437,084

[22] Filed: Nov. 16, 1989

[30] Foreign Application Priority Data

Nov. 17, 1988 [JP] Japan ................... 63-293128

[51] Int. Cl.$^5$ .................. C08G 59/68; C08G 59/50
[52] U.S. Cl. ....................... 528/94; 528/103; 528/111; 528/117
[58] Field of Search .............. 528/94, 117, 111, 103

[56] References Cited

U.S. PATENT DOCUMENTS

| | | | |
|---|---|---|---|
| 3,634,323 | 1/1972 | Moran | 528/94 |
| 4,331,582 | 5/1982 | Babayan | 528/94 X |
| 4,529,755 | 7/1985 | Nishikawa et al. | 523/467 X |
| 4,572,853 | 2/1986 | Ikeya et al. | 428/414 X |
| 4,617,584 | 10/1986 | Ikeya et al. | 525/485 X |
| 4,710,796 | 12/1987 | Ikeya et al. | 523/460 X |

*Primary Examiner*—Earl Nielsen
*Attorney, Agent, or Firm*—Wegner, Cantor, Mueller & Player

[57] ABSTRACT

Two part epoxy resin system comprising a main component comprising a bisphenol type epoxy resin having not more than 0.08% by weight of a content of a saponifiable chlorine-containing group and a curing component comprising a modified aromatic polyamine and a liquid imidazole, which has a long pot-life at room temperature and is curable even at an intermediate temperature such as about 50° to 60° C., and is useful as a paint composition, an adhesive, a lining material, a molding material and a floor covering material.

4 Claims, No Drawings

TWO PART EPOXY RESIN COMPOSITION

This invention relates to a two part epoxy resin system, more particularly to a two part epoxy resin system comprising a main component comprising a bisphenol type epoxy resin having not more than 0.08% by weight of a content of a saponifiable chlorine-containing group and a curing component comprising a modified aromatic polyamine and a liquid imidazole, which has a long pot-life at room temperature and is curable even at an intermediate temperature such as about 50° to 60° C.

PRIOR ART

Two part epoxy resin compositions comprise usually a main component comprising an epoxy resin and a curing component comprising an amine type curing agent and have been widely used as a paint composition, an adhesive, a lining material, a molding material, and the like. In these conventional two part epoxy resin compositions, however, the curing agent must be used in a large amount in order to effectively produce the curing reaction, which results disadvantageously in shortening of the pot-life after mixing the main component and the curing component at room temperature. Further, it necessitates the use of a higher temperature such as higher than 100° C. for the curing reaction. Accordingly, the conventional two part epoxy resin compositions are limited in the practical use thereof.

BRIEF DESCRIPTION OF THE INVENTION

The present inventors have intensively searched for an improved two part epoxy resin composition in order to eliminate the above-mentioned drawbacks in the conventional compositions. After studying the relationship between the content of the saponifiable chlorine-containing group

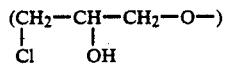

in a bisphenol type epoxy resin and the curability of the epoxy resin, they have found that by using a bisphenol type epoxy resin having a specific range of the saponifiable chlorine-containing group content as the main component, and by using a combination of a modified aromatic polyamine and a liquid imidazole as the curing agent, the amount of the curing agent can be minimized and thereby the pot-life of the composition can be prolonged at room temperature. Further, the composition can be cured even at an intermediate temperature such as about 50° to 60° C.

An object of this invention is to provide an improved two part epoxy resin composition having a long pot-life at room temperature and being able to be cured even at an intermediate temperature. Another object of the invention is to provide a two part epoxy resin composition comprising a main component comprising a bisphenol type epoxy resin having a specific range of a saponifiable chlorine-containing group content and a curing component comprising a combination of a modified aromatic polyamine and a liquid imidazole, which can be cured in a comparatively small amount of the curing component. These and other objects and advantages of the invention will be apparent to those skilled in the art from the following description.

DETAILED DESCRIPTION OF THE INVENTION

The two part epoxy resin composition of this invention comprises a main component comprising a bisphenol type epoxy resin having not more than 0.08% by weight of a content of a saponifiable chlorine-containing group and a curing component comprising a modified aromatic polyamine and a liquid imidazole.

The bisphenol type epoxy resin used in this invention includes, for example, bisphenol A [i.e. 2,2-bis(4'-hydroxyphenyl)propane], bisphenol F [i.e. bis(4-hydroxyphenyl)methane], brominated bisphenol A, diglycidyl ether of bisphenol AD (i.e. bis(4-hydroxyphenyl)ethane), diglycidyl ether of bisphenol A alkylene oxide adduct (e.g. ethylene oxide adduct or propylene oxide adduct), and the like, which have not more than 0.08% by weight, preferably not more than 0.05% by weight, of the content of a saponifiable chlorine-containing group derived from epichlorohydrin which is used as the starting material for preparing the epoxy resins. When the epoxy resin has more than 0.08% by weight of the saponifiable chlorine-containing group content, the epoxy resin composition can not be cured at an intermediate temperature.

The modified aromatic polyamine used in this invention includes, for example, bisphenol epoxy adduct of diaminodiphenylmethane (DDM), diaminodiphenylsulfone (DDS), meta-phenylenediamine (MPDA) or diaminodiethyldiphenylmethane, which is usually mixed with a solvent having a high boiling point [e.g. dibutyl phthalate (DBP), benzyl alcohol, etc.). Commercially available products of such type of modified aromatic polyamine are Adeka Hardener EH-533, Adeka Hardener EH-536-3 (manufactured by Asahi Denka Kogyo K.K., Japan), Fuji Cure 6010 (manufactured by Fuji Kasei Kogyo K.K., Japan), Luckamide WH-619 (manufactured by Dainippon Ink Kagaku Kogyo K.K., Japan), and the like. The modified aromatic polyamine is used in an amount of 25 to 65 parts by weight, preferably 35 to 55 parts by weight, to 100 parts by weight of the epoxy resin. When the amount of the modified aromatic polyamine is less than 25 parts by weight, the curing effect cannot be sufficiently exhibited and hence the epoxy resin composition can not show sufficient beneficial properties. On the other hand, when the amount of the modified aromatic polyamine is more than 65 parts by weight, the epoxy resin composition shows a tacky surface when cured and tends to show inferior properties.

The liquid imidazole includes, for example, 1-isobutyl-2-methylimidazole, 1-cyanoethylaminoethyl-2-methylimidazole, or 1-benzyl-2-methylimidazole, and it is usually used in an amount of 6 to 12 parts by weight to 100 parts by weight of the modified aromatic polyamine, that is, in a ratio of the modified aromatic polyamine to the liquid imidazole of 100/6–12. When the liquid imidazole is used in a ratio less than the above range, the effect of the liquid imidazole can not be achieved, but on the other hand, when the ratio of the liquid imidazole is more than the above range, the epoxy resin composition gives a brittle cured product.

With the two part epoxy resin composition of this invention which comprises the main component comprising the above-mentioned bisphenol type epoxy resin and the curing component comprising the above-mentioned modified aromatic polyamine and liquid imidazole, the curing agent can be used in a smaller amount in comparison with the conventional two part epoxy resin compositions and hence the pot-life thereof at room temperature can be prolonged. Further, the composition can be sufficiently cured even at an intermediate temperature such as about 50° to 60° C.

(2) Curability:

The curability was tested under the curing conditions as shown in Table 1, and the Shore hardness was measured with Shore durometer (D scale). The results are shown in Table 1.

TABLE 1

| Curing conditions | Epoxy resin and the content of the saponifiable chlorine-containing group (%) | | | | | | | | |
|---|---|---|---|---|---|---|---|---|---|
| | Bisphenol A type | | | | | | Bisphenol F type | | |
| | 0.004*1 (No. 1) | 0.028*2 (No. 2) | 0.048*3 (No. 3) | 0.072*4 (No. 4) | 0.148*5 (Ref. Ex. 1) | 0.236*6 (Ref. Ex. 2) | 0.043*7 (No. 5) | 0.076*8 (No. 6) | 0.201*9 (Ref. Ex. 3) |
| 50° C. × 4 hr. | 82 | 80 | 73 | 70 | 35 | x (Not curred) | 72 | 67 | x (Not curred) |
| 50° C. × 5 hr. | 84 | 84 | 83 | 83 | 73 | 62 | 83 | 82 | 60 |
| 50° C. × 6 hr. | 86 | 86 | 85 | 85 | 83 | 79 | 84 | 84 | 80 |

*1 Bisphenol A type epoxy resin, trade name: Epikote 828 US
*2 Bisphenol A type epoxy resin, trade name: Epikote 828 EL
*3-*6 Various grades of bisphenol A type epoxy resin (trade name: Epikote 828) having various contents of the saponifiable chlorine-containing group.
*7-*9 Various grades of bisphenol F type epoxy resin (trade name: Epikote 807) having various contents of the saponifiable chlorine-containing group.

The two part epoxy resin composition of this invention may also be incorporated with an appropriate amount of an organic solvent, a filler, a plasticizer, and other conventional additives as in the conventional two part epoxy resin compositions.

The two part epoxy resin composition of this invention can be used as a paint composition, an adhesive, a lining material, a molding material, and further as a floor covering material. Because of the longer pot-life at room temperature and the curability even at an intermediate temperature, the composition can be cured even by mild heating with a dryer without any limitation in laying operation.

This invention is illustrated by the following Examples and Reference Examples, but should not be construed to be limited thereto.

EXAMPLE 1 (NOS. 1 TO 6) AND REFERENCE EXAMPLES 1 TO 3

In these examples, the relationship between the content of a saponifiable chlorine-containing group of bisphenol type epoxy resin and the curability is studied.

(1) Two part epoxy resin compositions:

The main component, bisphenol type epoxy resin

There are used various bisphenol type epoxy resins having the saponifiable chlorine-containing group contents as shown in Table 1 (which are all manufactured by Yuka Shell K.K.).

The curing component

A modified aromatic polyamine (Adeka Hardener EH-536-3, manufactured by Asahi Denka Kogyo K.K.) and a liquid imidazole (IBMI-12, manufactured by Yuka Shell Epoxy K.K.) are mixed in a ratio of 100/8 by weight.

The above main component and the curing component are used in a ratio of 100/35 by weight.

EXAMPLES 2 TO 5 AND REFERENCE EXAMPLES 4 TO 6

(1) Two part epoxy resin compositions:

The compositions are prepared by using the components and their amounts as shown in Table 2.

(2) Pot-life:

As to each composition (5 kg), the pot-life was measured at 20° C.

(3) Curability:

The curability was tested under the curing conditions as shown in Table 2, and the Shore hardness was measured with Shore durometer (D scale). The results are shown in Table 2.

TABLE 2

| | Examples | | | | Reference Examples | | |
|---|---|---|---|---|---|---|---|
| | 2 | 3 | 4 | 5 | 4 | 5 | 6 |
| Bisphenol F type epoxy resin (saponifiable chlorine-contaning group content: 0.048%) | 100 | 100 | 100 | 100 | 100 | 100 | 100 |
| Modified aromatic polyamine alone | — | — | — | — | 50 | 45 | 40 |
| Mixture of modified aromatic polyamine/liquid imidazole (25/2 by weight) | 45 | 40 | 35 | 30 | — | — | — |
| Pot-life (minute) | 580 | 720 | 1200 | 1500 | 720 | 1000 | 1200 |
| Curing conditions: | | | | | | | |
| 50° C. × 4 hr. | 80 | 75 | 72 | 44 | x | x | x |
| 60° C. × 3 hr. | 86 | 86 | 86 | 86 | 10 | x | x |
| 70° C. × 3 hr. | 86 | 86 | 86 | 86 | 84 | 65 | 57 |

What is claimed is:

1. A two part epoxy resin system which comprises a main component comprising a bisphenol type epoxy resin having not more than 0.08% by weight of a content of a saponifiable chlorine-containing group and a curing component comprising an epoxy modified aromatic polyamine and a liquid imidazole.

2. The system according to claim 1, wherein the bisphenol type epoxy resin has not more than 0.05% by weight of the content of a saponifiable chlorine-containing group.

3. The system according to claim 1, wherein the epoxy modified aromatic polyamine is contained in an amount of 25 to 65 parts by weight to 100 parts by weight of the bisphenol type epoxy resin, and the liquid imidazole is contained in an amount of 6 to 12 parts by weight to 100 parts by weight of the epoxy modified aromatic polyamine.

4. The system according to claim 3, wherein the amount of the epoxy modified aromatic polyamine is in the range of 35 to 55 parts by weight to 100 parts by weight of the bisphenol type epoxy resin.

* * * * *